US008965606B2

(12) United States Patent
Mizutani (10) Patent No.: US 8,965,606 B2
(45) Date of Patent: Feb. 24, 2015

(54) WATERCRAFT INCLUDING OPERATING DEVICES TO ADJUST AN AMOUNT AND A DIRECTION OF A PROPULSIVE FORCE OF THE WATERCRAFT

(75) Inventor: Makoto Mizutani, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 442 days.

(21) Appl. No.: 12/189,282

(22) Filed: Aug. 11, 2008

(65) Prior Publication Data

US 2009/0076671 A1 Mar. 19, 2009

(30) Foreign Application Priority Data

Sep. 14, 2007 (JP) .................................. 2007-239331

(51) Int. Cl.
| | |
|---|---|
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |
| G05D 1/02 | (2006.01) |
| B63H 21/22 | (2006.01) |
| B63H 25/04 | (2006.01) |

(52) U.S. Cl.
CPC .............. *G05D 1/0206* (2013.01); *B63H 21/22* (2013.01); *B63H 25/04* (2013.01)
USPC .......................................................... 701/21

(58) Field of Classification Search
USPC .......................................................... 701/21
See application file for complete search history.

(56) References Cited

U.S. PATENT DOCUMENTS

| | | | |
|---|---|---|---|
| 6,549,830 B2 * | 4/2003 | Harada et al. ................... | 701/21 |
| 7,127,333 B2 | 10/2006 | Arvidsson | |

(Continued)

FOREIGN PATENT DOCUMENTS

| | | |
|---|---|---|
| JP | 2002-234495 A | 8/2002 |
| WO | 2007/010767 A1 | 1/2007 |

OTHER PUBLICATIONS

Official Communication issued in corresponding Japanese Patent Application No. 2007-239331, drafted on Feb. 27, 2012.

*Primary Examiner* — Imran Mustafa
(74) *Attorney, Agent, or Firm* — Keating & Bennett, LLP (57) ABSTRACT

A watercraft includes a plurality of watercraft operating devices arranged to adjust an amount and/or a direction of a propulsive force or a resistance provided to a prescribed position of the watercraft, operation devices arranged to operate the plurality of watercraft operating devices, actuators arranged to actuate the respective watercraft operating devices, and a control unit arranged to control an operation amount of each of the actuators based on an operational state of the operation devices. The control unit preferably includes a traveling state detecting device arranged to detect a traveling state of the watercraft, an operational state detecting device arranged to detect an operational state of the operation devices, a traveling plan estimating device arranged to estimate a traveling plan of an operator of the watercraft based on the traveling state and the operational state, and a watercraft operating device controlling device arranged to select one of the watercraft operating devices to be controlled from the plurality of watercraft operating devices, and arranged to control an operating amount of the actuator operating the watercraft operating device.

4 Claims, 9 Drawing Sheets

(56) References Cited

U.S. PATENT DOCUMENTS

| | | | |
|---|---|---|---|
| 2001/0051476 A1* | 12/2001 | Harada et al. | 440/84 |
| 2003/0191562 A1* | 10/2003 | Robertson et al. | 701/21 |
| 2004/0242091 A1* | 12/2004 | Okuyama et al. | 440/86 |
| 2007/0028824 A1* | 2/2007 | Stallings | 114/151 |
| 2007/0113769 A1* | 5/2007 | Stallings et al. | 114/144 R |
| 2008/0027597 A1* | 1/2008 | Barrett et al. | 701/21 |
| 2008/0027957 A1* | 1/2008 | Bruckner et al. | 707/101 |
| 2010/0121505 A1 | 5/2010 | Yamazaki et al. | |

* cited by examiner

WATERCRAFT INCLUDING OPERATING DEVICES TO ADJUST AN AMOUNT AND A DIRECTION OF A PROPULSIVE FORCE OF THE WATERCRAFT

BACKGROUND OF THE INVENTION

1. Field of the Invention

The present invention relates to a watercraft including a plurality of watercraft operating devices arranged to adjust an amount and a direction of a propulsive force or a resistance of the watercraft. The operating devices are arranged in a manner such that their movements are controlled during operation of the watercraft.

2. Description of the Related Art

A watercraft has a large number of watercraft operating devices such as an engine, a rudder, a thruster, a trawling motor, a flap, a trim, etc., that are provided in prescribed positions and can adjust an amount and a direction of a propulsive force or a resistance of the watercraft. The watercraft operating devices are constructed so that they can be operated by respective operation devices such as a steering wheel, a joystick lever, an accelerator, a trim switch, or the like. The respective watercraft operating devices are mechanically or electrically connected to the operation devices and are operated by actuators in accordance with the operation of the operation devices, thereby operating the watercraft.

To control a conventional watercraft, an operator of the watercraft is required to select a watercraft operating device to be operated, determine an operation amount thereof, and operate the operation device corresponding to the watercraft operating device. Operation amounts of the watercraft operating devices need to be adjusted in accordance with a traveling state of the watercraft. Therefore, operating a conventional watercraft requires much effort, and this operation tends to be affected by differences in knowledge and experience between operators.

To make it easier to operate a watercraft, for example, a control device by which a plurality of watercraft operating devices can be operated in a combined manner is disclosed in JP-A-2001-152898. An operator of a watercraft can combine operations of all watercraft operating devices affecting specific traveling characteristics such as engine and trim angle operations, and thereby optimize the way that operations are combined in accordance with preferences of an operator and the environment in which the watercraft is operated.

U.S. Pat. No. 7,127,333 discloses a remote control system configured in a manner such that a steering direction, etc., can be adjusted to correspond to an orientation of the watercraft by controlling the watercraft by a remote controller. Therein, it is possible to optimize directions of the watercraft operating devices corresponding to a traveling state of the watercraft.

However, in conventional watercraft, one or several specific watercraft operating devices are operated by each of the operation devices even though operation amounts of the plurality of watercraft operating devices are automatically optimized as in JP-A-2001-152898, or the operating directions of the watercraft operating devices are automatically adjusted corresponding to a traveling state as in U.S. Pat. No. 7,127,333. Therefore, it requires the operator of the watercraft to select the various watercraft operating devices.

However, there are many cases in which it is preferable to operate different watercraft operating devices in the same operational state, and thus the operation of the watercraft requires much effort when inappropriate watercraft operating devices are selected. Furthermore, knowledge and experience, etc., of an operator of the watercraft tend to be required in order to precisely achieve a desired traveling plan, thus making it difficult to achieve comfortable operation of the watercraft.

SUMMARY OF THE INVENTION

In order to overcome the problems described above, preferred embodiments of the present invention provide a watercraft in which a desired traveling plan can be achieved and operational comfort is facilitated.

A first preferred embodiment of the present invention provides a watercraft including a plurality of watercraft operating devices arranged to adjust an amount and/or a direction of a propulsive force or a resistance provided to a prescribed position of the watercraft, operation devices arranged to operate the plurality of watercraft operating devices, actuators arranged to drive the respective watercraft operating devices, and a control unit arranged to control an operation amount of each of the actuators based on an operational state of the operation device. The control unit preferably includes a traveling state detecting device arranged to detect a traveling state of the watercraft, an operational state detecting device arranged to detect an operational state of the operation device, a traveling plan estimating device arranged to estimate a traveling plan of an operator of the watercraft based on the traveling state and the operational state, and a watercraft operating device controlling device arranged to select (1) at least one watercraft operating device from the plurality of watercraft operating devices to be controlled, and (2) an operating amount of an actuator operating the at least one watercraft operating device.

A second preferred embodiment of the present invention provides a watercraft, in which the operation device includes a speed controlling system, such as an accelerator, arranged to adjust a traveling speed of the watercraft, and a direction controlling system, such as a steering wheel and a joystick, arranged to adjust a traveling direction of the watercraft. The watercraft operating devices include a propulsion adjusting system arranged to adjust an amount of a propulsive force or a resistance provided to the watercraft, and a direction adjusting system arranged to adjust a direction and a point of application of the propulsive force or the resistance provided to the watercraft. The watercraft operating device controlling device selects the propulsion adjusting system to be controlled by the direction controlling system.

A third preferred embodiment of the present invention provides a watercraft in which the watercraft operating device controlling device sets a target movement change of the watercraft required to achieve the traveling plan, calculates a target controlling force including an amount, a direction, and a point of application of the propulsive force or resistance that applies to the entire watercraft based on the target movement change, selects the watercraft operating device to be controlled based on the target controlling force, and determines an operation amount of the actuator of the watercraft operation device.

A fourth preferred embodiment of the present invention provides a watercraft in which the watercraft operating device controlling device sets a new target movement change after controlling the operation amount of the actuator based on a traveling plan. This traveling plan corresponds to a deviation amount of a difference between the traveling states before and after the control and the target movement change.

A fifth preferred embodiment of the present invention provides a watercraft in which the watercraft operating device controlling device selects a watercraft operating device other than the currently controlled watercraft operation device, and determines an operation amount of the watercraft operating device as if the currently controlled watercraft operating device is not working properly.

In the first preferred embodiment of the present invention, the control unit preferably estimates a traveling plan of an operator of the watercraft based on a traveling state and an operational state of the operation device, selects a watercraft operating device to be controlled based on the traveling plan, and controls an operation amount of the actuator operating the watercraft operating device. Therefore, this provides automatic optimization of the watercraft operating devices in order to achieve the traveling plan and watercraft operating state of the watercraft operating devices.

Accordingly, this simplifies the efforts of an operator of the watercraft in selecting a watercraft operating device and adjusting an operation amount of the actuator for each of the watercraft operating devices, and facilitates achievement of a desired traveling state independent from knowledge and experience, etc., of an operator of the watercraft. This also results in a comfortable operation of the watercraft.

The watercraft can be effectively operated because the selection and operation amount of the watercraft operating device is optimized. This operation reduces the number of watercraft operating devices used and the amounts of their movements. Accordingly, this increases the durability of the watercraft operating devices.

In the second preferred embodiment of the present invention, the propulsive force or resistance of the propulsion adjusting system disposed in the prescribed position is controlled by operation of the direction controlling system. Therefore, appropriate turning and in-place turning can be facilitated.

In the third preferred embodiment of the present invention, the watercraft operating device controlling device preferably sets a target movement change of the watercraft required to achieve the traveling plan, calculates a target controlling force including an amount, a direction, and a point of application of the propulsive force or resistance that applies to the entire watercraft based on the target movement change, selects the watercraft operating device to be controlled, and determines the operation amount of the actuator. Therefore, precise achievement of the estimated traveling plan and enhancement of the operational comfort can be facilitated.

In the fourth preferred embodiment of the present invention, the watercraft operating device controlling device preferably sets a new target movement change after controlling the operation amount of a watercraft operating device. This target movement change corresponds to a deviation amount between an actual change in the traveling state and the target movement change. This facilitates a precise achievement of the traveling plan of an operator of the watercraft.

In the fifth preferred embodiment of the present invention, the watercraft operating device controlling device preferably selects another watercraft operating device and determines an operation amount of an actuator of the selected watercraft operating device as if the operating device is not working properly. Therefore, the watercraft can be operated in a case where one or more of the watercraft operating devices are not working properly.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Description will hereinafter be made of a watercraft according to preferred embodiments of the present invention with reference to FIGS. 1 through 9D.

Figure 1:
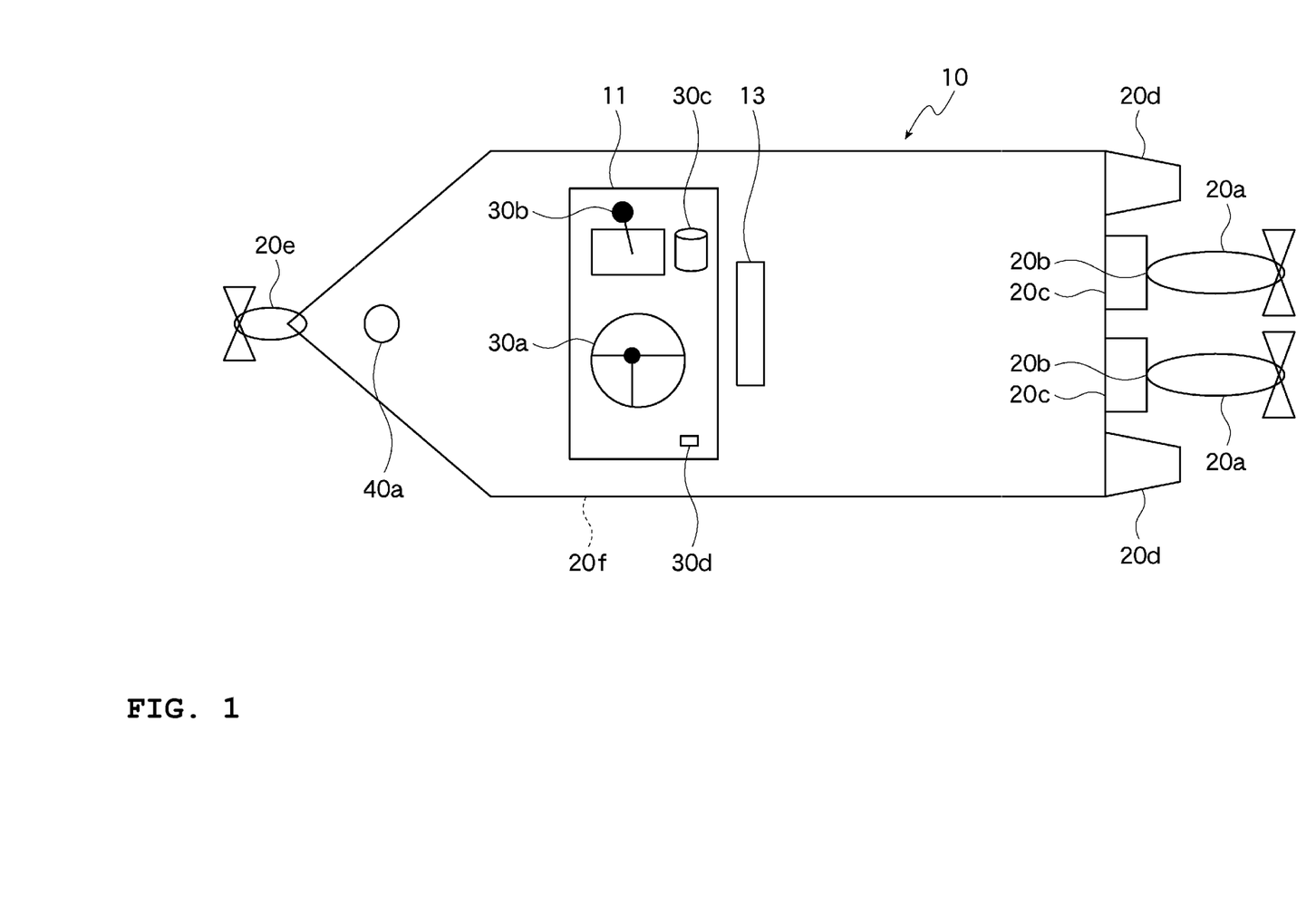
FIG. 1 is a plan view schematically showing a watercraft in accordance with a preferred embodiment of the present invention.
Figure 2:
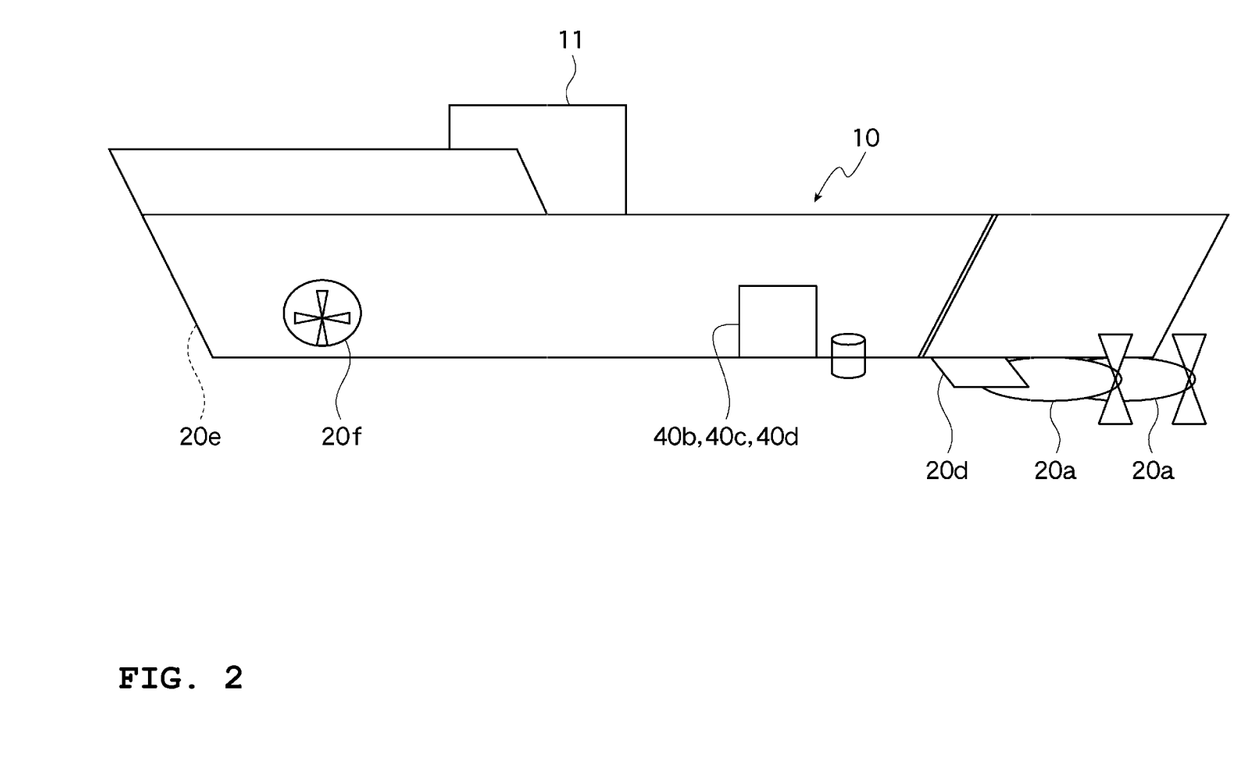
FIG. 2 is a side view schematically showing the watercraft in accordance with a preferred embodiment of the present invention.

FIGS. 1 and 2 schematically show a small watercraft according to a preferred embodiment of the present invention. A watercraft 10 includes a large number of watercraft operating devices 20a-20f for providing a propulsive force or a resistance to the watercraft 10. The watercraft operating devices are disposed in prescribed positions, and include, for example, two outboard motors 20a arranged at a stern, steering systems 20b arranged to steer the two outboard motors 20a, trims 20c arranged to adjust trim angles of the two outboard motors 20a, flaps 20d arranged on both sides of a bottom of the stern, a trawling motor 20e disposed at a bow, a bow thruster 20f disposed at a bottom in a vicinity of the bow, and the like.

At least one cockpit 11 has a large number of operation devices 30a-30d, such as, a steering wheel 30a, a joystick 30b, an accelerator 30c, a shift device 30d, or the like, arranged to allow an operator of the watercraft to operate the large number of watercraft operating devices 20a-20f. The large number of operation devices 30a-30d and the large number of watercraft operating devices 20a-20f are electrically connected via a control unit 13.

The operation devices 30a-30d of the watercraft 10 include direction controlling systems operated to adjust a traveling direction of the watercraft 10, such as the steering wheel 30a and the joystick 30b, and speed controlling systems, such as the accelerator 30c, arranged to adjust a traveling speed of the watercraft 10. Each of the operation devices 30a-30d includes an operating element that an operator of the watercraft operates manually, and an operation detector arranged to detect each operational state, such as a position of the operating element, an operation amount, an operation speed, or the like, and is configured to transmit the operational state detected by the operation detector to the control unit 13.

For example, as shown in Table 1, the watercraft operating devices 20a-20f of the watercraft 10 include propulsion adjusting devices arranged to adjust an amount of a propulsive force or a resistance provided to the watercraft 10, such as a propulsion adjuster to adjust the propulsive force and a resistance adjuster to adjust the resistance. Direction adjusting devices are arranged to adjust a direction of application and a point of application of the propulsive force or the resistance provided to the watercraft 10, such as an application direction adjuster to adjust a direction of application of the propulsive force or the resistance, and an application point adjuster to adjust a point of application of the propulsive force or the resistance. Some or all of the watercraft operating devices may include a plurality of kinds of adjusters or devices which operate as adjusting systems.

An actuator is provided in each of the watercraft operating devices 20a-20f. Each of the watercraft operating devices 20a-20f is operated by a signal from the control unit 13. In the present preferred embodiment, operation detectors arranged to detect each kind of operating state are provided in some or all of the watercraft operating devices 20a-20f, and are configured to transmit operating states of each of the watercraft operating devices 20a-20f to the control unit 13.

TABLE 1

| Watercraft Operating Device | Propulsion Adjusting Device | | Direction Adjusting Device | |
|---|---|---|---|---|
| | Propulsion Adjuster | Resistance Adjuster | Application Direction Adjuster | Application Point Adjuster |
| Engine | o | | | |
| Clutch | o | | | |
| Throttle | o | | | |
| Brake | o | | | |
| Motor | o | | | |
| Propeller | o | | | |
| Bow Thruster | o | | | |
| Trawling Motor | o | | o | |
| Flap | | o | | o |
| Interceptor | | o | | o |
| Sea Anchor | | o | | o |
| Spanker | | o | | o |
| Steering System | | | o | |
| Toe Angle Adjuster | | | o | o |
| Trim | | o | o | o |
| Tilt | | | o | o |
| Elevator | | | o | o |

The watercraft 10 includes each kind of traveling state detector 40a-40d arranged to detect each kind of traveling state of the watercraft 10. The traveling state is a physical state of the watercraft 10 that can be detected by each kind of detector. The traveling states are, for example, movements such as stopping, traveling forward, traveling rearward, turning, turning in-place, substantially parallel movement, position, speed, acceleration, orientation, angular speed, angular acceleration, attitude, etc. of the watercraft.

Examples of the traveling state detectors 40a-40d are a GPS 40a arranged to determine a position of the watercraft 10, a direction finder 40b arranged to find a direction of the watercraft 10, a yaw rate sensor 40c arranged to measure a turning speed, an attitude sensor 40d arranged to measure an inclination of an axial direction of the watercraft 10 or a direction substantially perpendicular to the axial line. The traveling state detectors 40a-40d are configured to transmit each kind of traveling state detected by the traveling state detectors 40a-40d to the control unit 13.

In a watercraft 10 having such a configuration, an operational state of each kind of the operation device 30a-30d is transmitted to the control unit 13 when an operator of the watercraft operates each kind of operation device 30a-30d in the cockpit 11. The control unit 13 controls traveling of the watercraft 10 based on operational states received from the operation devices 30a-30d and the traveling state transmitted from the traveling state detectors 40a-40d, etc.

Figure 3:
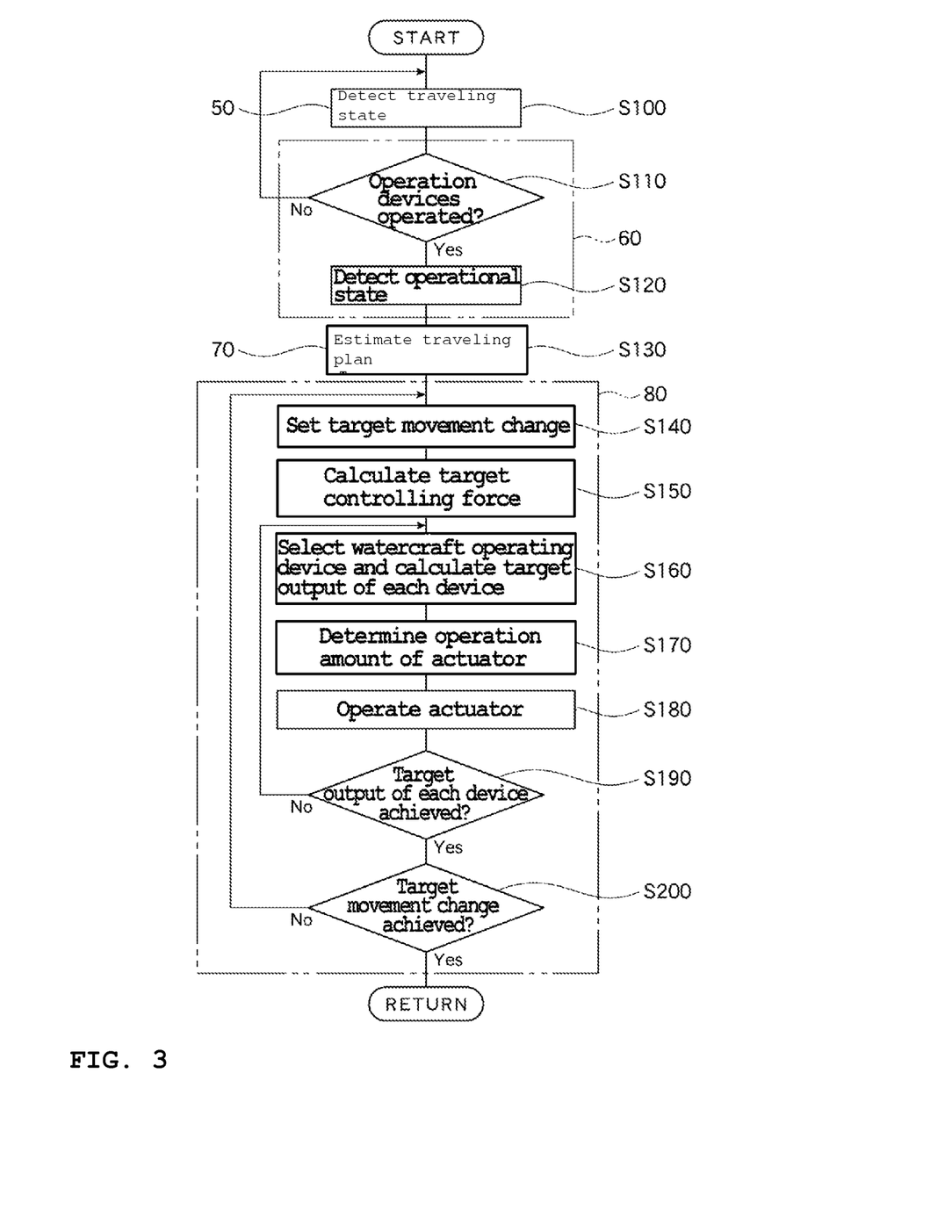
FIG. 3 is a flowchart of control operations executed in a control unit in accordance with a preferred embodiment of the present invention.

As shown in FIG. 3, the control unit 13 includes a traveling state detecting device 50 arranged to detect the traveling state of the watercraft 10 transmitted from the traveling state detectors 40a-40d, an operation state detecting device 60 arranged to detect operational states, (positions of the operation elements transmitted from sensors, etc., of the operation devices 30a-30d) and operation amounts (operation speeds, etc.), a traveling plan estimating device 70 arranged to estimate the traveling plan of an operator of the watercraft based on the traveling state and the operational states, and a watercraft operating device controlling device 80 arranged to execute controls based on the traveling plan.

In such a control unit 13, first the traveling state is constantly detected by the traveling state detectors 40a-40d and transmitted to the traveling state detecting device 50 in step S100.

Thereafter, when an operator of the watercraft operates the operating element of each of the operation devices 30a-30d, the operational state detecting device 60 makes a determination about the operation of the operation device 30a-30d in step S110. The process goes to step S120, and the operational state such as the position of the operating element, operation amount, and operation speed are detected. Then, the traveling plan estimating device 70 estimates the traveling plan of an operator of the watercraft based on the detected operational state in step S130.

The traveling plan herein means, for example, a traveling plan that an operator of the watercraft is trying to achieve by operating one or a plurality of the operation devices 30a-30d, a change in the traveling state that an operator is trying to achieve, etc.

The traveling plan may be estimated as a traveling state including only movement of the watercraft such as, straight traveling, turning, in-place turning, and substantially parallel movement, or estimated as a specific traveling state if the traveling state can be quantitatively detected as a specific traveling state. Furthermore, the traveling state may be estimated as a perceptual traveling state such as high speed, medium speed, low speed, very low speed, fast acceleration, medium acceleration, slow acceleration, fast turning, medium turning, slow turning, etc.

The traveling state described above can be estimated corresponding to the operational state with use of a preset map, etc., and the operational state such as the position of the operating element, operation amount, and operation speed of the single operation device 30a-30d, or a combination of the operational states of a plurality of operation devices 30a-30d.

The traveling state can be estimated with a concordance such as, Table 2, in a case where the traveling state is estimated based on operational states of the steering wheel 30a, the joystick 30b, the accelerator 30c, and the shift device 30d, etc.

TABLE 2

| Traveling State | | Operational State | | | | | |
|---|---|---|---|---|---|---|---|
| | Accelerator | OPEN | CLOSE | OPEN | CLOSE | CLOSE | CLOSE |
| | Shift Device | FR | FR | N | N | N | N |
| | Steering Wheel | N, L, R | N, L, R | L, R | L, R | N, L, R | N |
| | Joystick | N | N | N | N | Operation | N |
| Speed High Speed | | Straight Travel, Turn | Straight Travel, Turn | Deceleration | Deceleration | Deceleration | Deceleration |
| Medium Speed | | Straight Travel, Turn | Straight Travel, Turn | Deceleration | Deceleration | Deceleration | Deceleration |
| Low Speed | | Straight Travel, Turn | Straight Travel, Turn | Deceleration | Deceleration | Deceleration | Deceleration |
| Stop | | Straight Travel, Turn | Straight Travel, Turn (Trawling) | In-place Turning | In-place Turning | In-place Turning/ Parallel Movement | Stop |
| Rearward Travel | | Straight Travel, Turn | Straight Travel, Turn | Deceleration | Deceleration | Deceleration | Deceleration |

In Table 2, the symbols L, R, and N denote left, right, and neutral operation of the steering wheel 30*a*. The symbols N, OPEN, and CLOSE denote neutral, opening a throttle valve, and closing the throttle valve during operation of the accelerator 30*c* and the joystick 30*b*, respectively. The symbols F, R, and N denote forward position, rearward position, and neutral position during operation of the shift device 30*d*. The symbol "/" denotes "or".

In Table 2, for example, if the detection results are that the traveling state is high speed, the operational state of the accelerator 30*c* is open, the operational state of the shift 30*d* is forward travel, the operational state of the steering wheel 30*a* is neutral, left, or right, and the operational state of the joystick 30*b* is neutral, then the traveling plan can be estimated to be straight traveling or turning. If the detection results are that the traveling state is stop, the operational state of the accelerator 30*c* is open, the operational state of the shift device 30*d* is neutral, the operational state of the steering wheel 30*a* is left or right, and the operational state of the joystick 30*b* is neutral, then the traveling state can be estimated to be in-place turning.

If the traveling state is estimated in step S130, the watercraft operating device controlling device 80 executes a process. The watercraft operating device controlling device 80 selects at least one specific watercraft operating device 20*a*-20*f* to be controlled from the large number of the watercraft operating devices 20*a*-20*f*, and controls the operation amount of the actuator to operate the at least one watercraft operating device 20*a*-20*f* that is to be controlled based on the traveling plan.

First, a target movement change of the watercraft required to achieve the traveling plan is set based on the traveling plan. Here, a target movement change preferably means quantity or a speed of change in the traveling state that is required to achieve the traveling plan. A target movement change includes, for example, speed, acceleration, angular speed, angular acceleration, attitude, moment, etc. of the watercraft. The target movement change may be a deviation between the traveling plan and a present traveling state when the traveling plan is quantitatively estimated. The target movement change may be a specific quantity or a speed of change in the traveling state that are predetermined based on a map, etc., corresponding to the estimated traveling plan in the case that the traveling plan is not quantitatively estimated. In any case, it is preferable that the target movement change be a value specified to the degree that the value can be a basis from which a target controlling force described later can be calculated.

For example, the target movement change based on the operational states detected in step S120 and the traveling plan detected in step S130 is a specific value about the movements shown in Table 3.

TABLE 3

| Operational State | Steering Wheel Rotational Angle | Steering Wheel Rotational Angle | Accelerator Angle | Joystick Inclination Angle | Joystick Rotational Angle |
|---|---|---|---|---|---|
| Traveling Plan | Turn | In-place Turning | Straight Travel | Parallel Movement | In-place Turning |
| Target Movement Change | Yaw Rate | Turning Speed | Traveling Speed | Lateral Movement Speed | Turning Speed |

Figure 4:
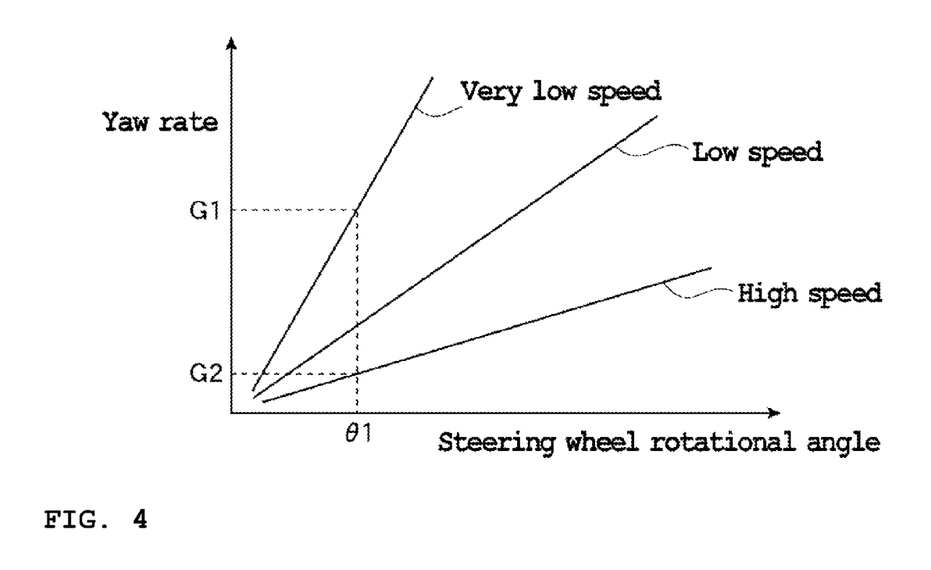
FIG. 4 is a graph for explaining a specific example of setting a target movement change in the control unit in accordance with a preferred embodiment of the present invention.

Furthermore, it is preferable that a set value be changed, as shown in FIG. 4, in accordance with the traveling state detected in step S100 in the case that the operational state is detected with a rotational angle of the steering wheel 30*a* in step S120 and a yaw rate or a lateral acceleration are set as the target movement change in step S140. For example, a yaw rate G1 is set for a rotational angle θ1 of the steering wheel when the traveling state is a very low speed. However, a yaw rate G2 which is much smaller than G1 is set for the same rotational angle θ1 of the steering wheel when the traveling state is high speed.

When the quantitative target movement change is set as described above, the process goes to step S150, and the target controlling force provided to the entire watercraft 10 is calculated based on the set target movement change. Now, the target controlling force is a force and/or a moment provided to the entire watercraft to achieve the target movement change, and includes an amount, a direction, a point of application, etc., of a propulsion including propulsive force or resistance. It is preferable that the calculated target controlling force be adjusted corresponding to the traveling state of the watercraft 10.

When the target controlling force is calculated in step S150, the process goes to step S160. In step S160, a single or a combination of the plurality of watercraft operating devices 20a-20f to be controlled are selected from the large number of the watercraft operating devices 20a-20f, and a target output of each of the selected watercraft operating devices 20a-20f is calculated based on the target controlling force so that the target controlling force can be provided to the watercraft 10.

To select the watercraft operating devices 20a-20f, for example, a propulsion that each of the watercraft operating devices 20a-20f provides to the watercraft 10 and a moment corresponding to each propulsion are previously calculated or measured from a position in which each of the watercraft operating devices 20a-20f is installed and the hydraulic power that the device can generate. The propulsion and the moment are stored in each of the watercraft operating devices 20a-20f. Thereby, the watercraft operating device 20a-20f, which can be more effectively controlled, can be selected from the watercraft operating devices 20a-20f by which the propulsion and moment are the closest to the target controlling force composed of a required propulsion and a required moment.

In selecting the watercraft operating device 20a-20f to be controlled, a single watercraft operating device may be selected from the large number of the watercraft operating devices 20a-20f, or a combination of the plurality of watercraft operating devices may be selected. Normally, a plurality of selecting patterns are possible by adjusting the target output of each of the watercraft operating devices 20a-20f. A similar target controlling force can be obtained with any selecting pattern. In such a case, it is preferable that the most effective watercraft operating device 20a-20f be selected, for example, the watercraft operating device 20a-20f by which the operation amount is minimized.

Figure 5:
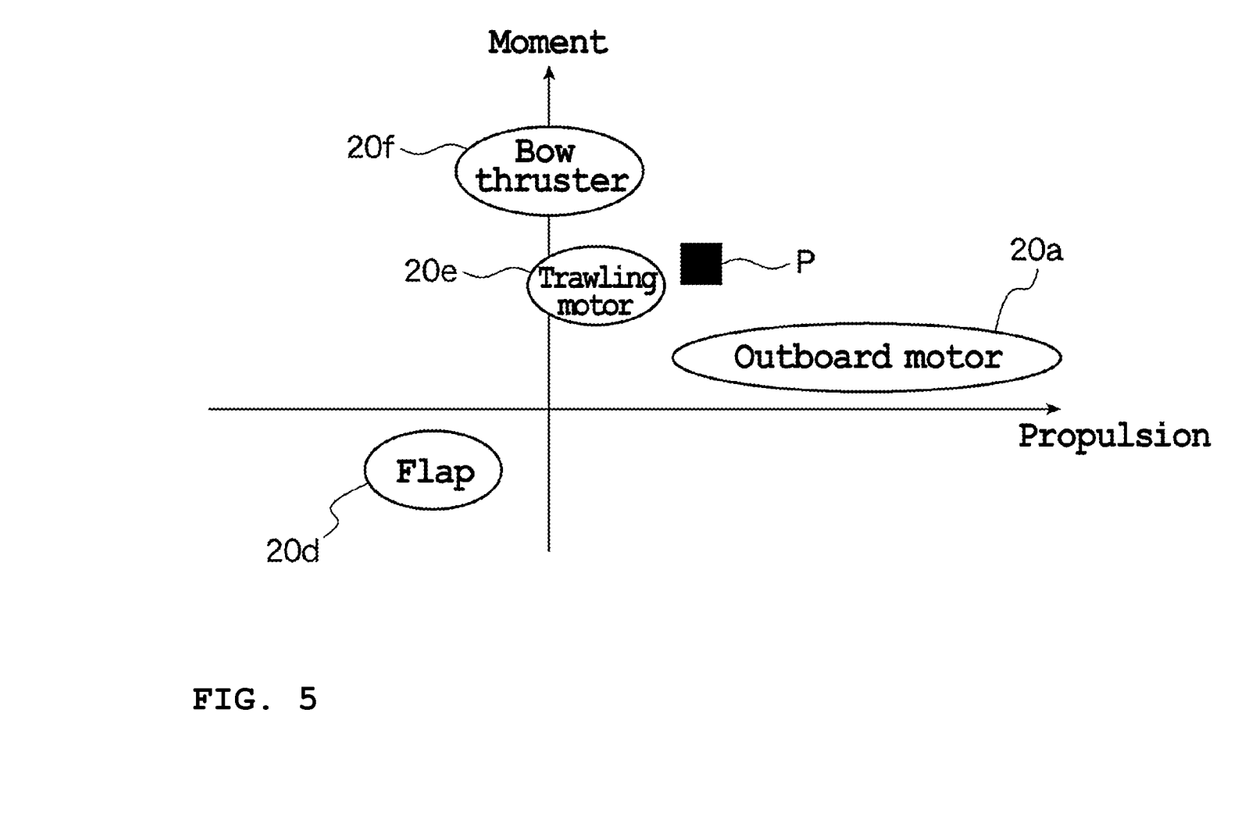
FIG. 5 is a diagram for describing specific examples of selections of watercraft operating devices in the control unit in accordance with a preferred embodiment of the present invention.

For example, if propulsion and moments that can be generated by the outboard motors 20a, the flaps 20d, the trawling motor 20e, and the bow thruster 20f are in a range shown in FIG. 5, and the target controlling force is P, the trawling motor 20e and the outboard motors 20a can be selected, which provides propulsion and moments the closest to the target controlling force P.

Simultaneously with such a selection of the watercraft operating devices 20a-20f, the target output of each of the watercraft operating devices 20a-20f are calculated so that a total of each target output and moments of all the selected watercraft operating devices 20a-20f to be controlled becomes the target controlling force. The calculation of the target outputs is made in combination with the selection of the watercraft operating devices 20a-20f so that the most efficient control can be achieved.

After the selection of the watercraft operating devices 20a-20f to be controlled and a calculation of their target outputs in the above manner, the process goes to step S170. In step S170, the operation amount of each of the actuators operating the watercraft operating devices 20a-20f to be controlled is determined. The actuators are operated in step S180. Thereby, the control is executed based on the traveling plan.

Figures 6A, 6B, 6C:
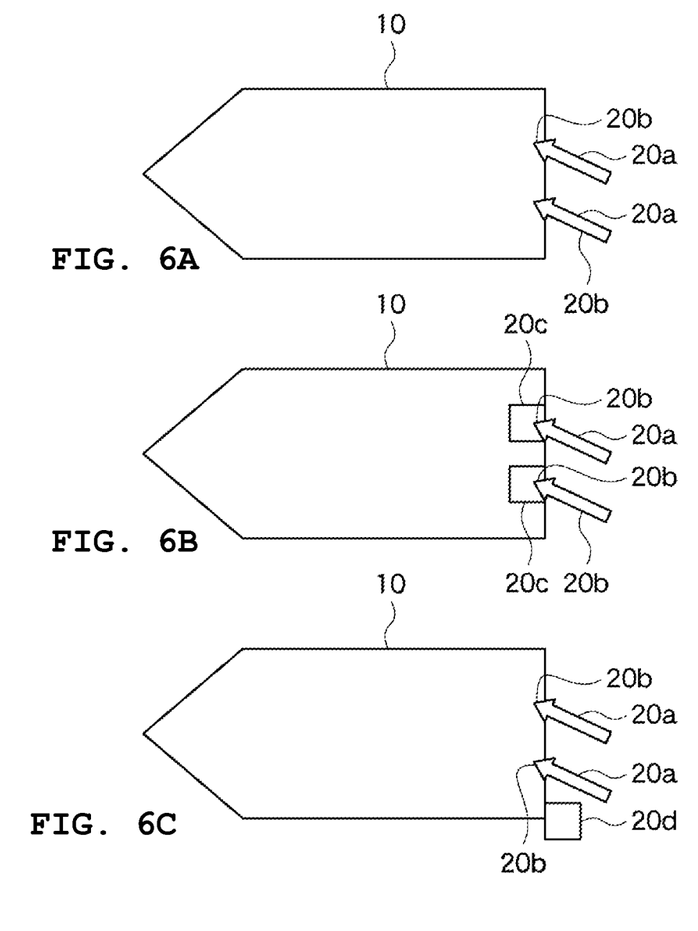
FIGS. 6A through 6F are diagrams for describing specific examples of selections of watercraft operating devices to be controlled through the control unit in accordance with preferred embodiments of the present invention with a turning traveling plan.

For example, as shown in FIG. 6A, the watercraft can turn by steering the outboard motors 20a by the steering systems 20b when the traveling state is medium speed and the traveling plan is turning. As shown in FIG. 6B, the watercraft can turn in a small rotational radius by steering the outboard motors 20a by the steering systems 20b and trimming the outboard motors 20a down by the trims 20c. Also, as shown in FIG. 6C, the watercraft can turn in a smaller rotational radius by steering the outboard motors 20a using the steering systems 20b and operating the inner flap 20d.

Figures 6D, 6E:
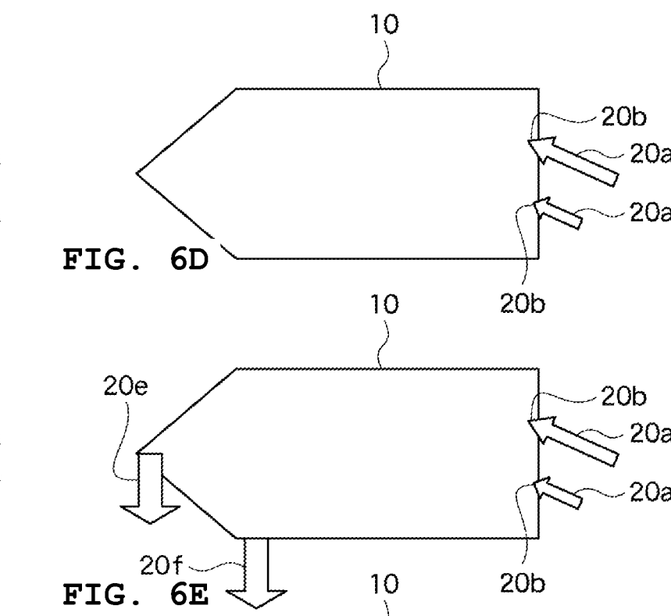

When the traveling state is a low speed and the traveling plan is turning, as shown in FIG. 6D, the outboard motors 20a are steered by the steering systems 20b and an engine output of the inner outboard motor 20a is made smaller than an engine output of the outer outboard motor 20a. This allows the watercraft to turn in a small rotational radius.

Figure 6F:
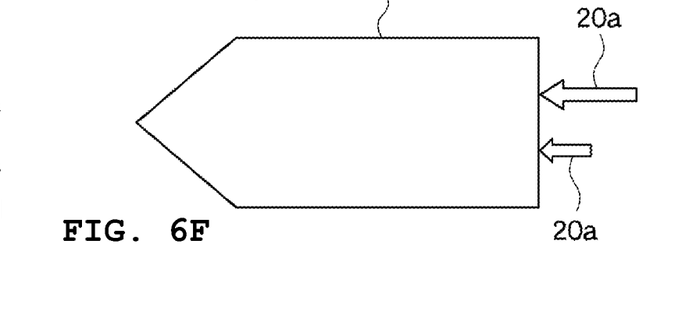

When the traveling state is a very low speed and the traveling plan is turning, as shown in FIG. 6E, the outboard motors 20a are steered by the steering systems 20b, the engine output of the inner outboard motor 20a is made smaller than the engine output of the outer outboard motor 20a, further the trawling motor 20e is operated while being directed inward, and the bow thruster 20f is operated while being directed inward. Thereby, the watercraft can turn in a very small rotational radius. As shown in FIG. 6F, the watercraft can turn by only making the engine output of the inner outboard motor 20a smaller than the engine output of the outer outboard motor 20a.

Figure 7A:
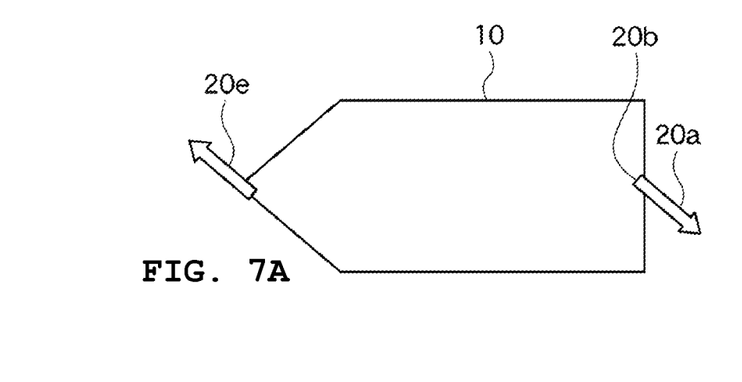
FIGS. 7A through 7D are diagrams for describing specific examples of selections of the watercraft operating devices to be controlled through the control unit in accordance with preferred embodiments of the present invention with an in-place turning traveling plan.
Figure 7B:
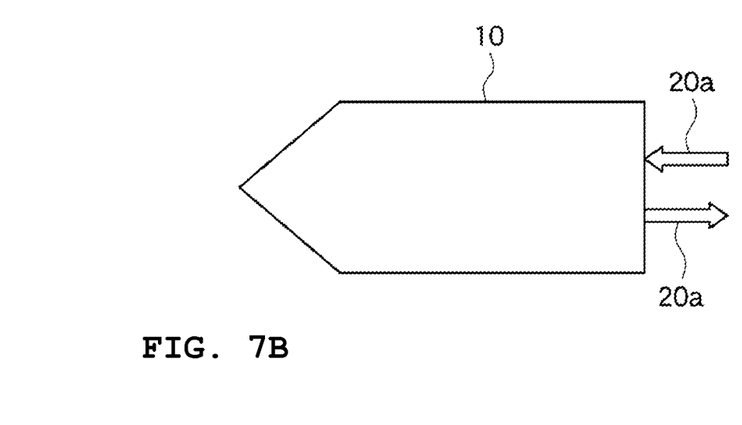
Figure 7C:
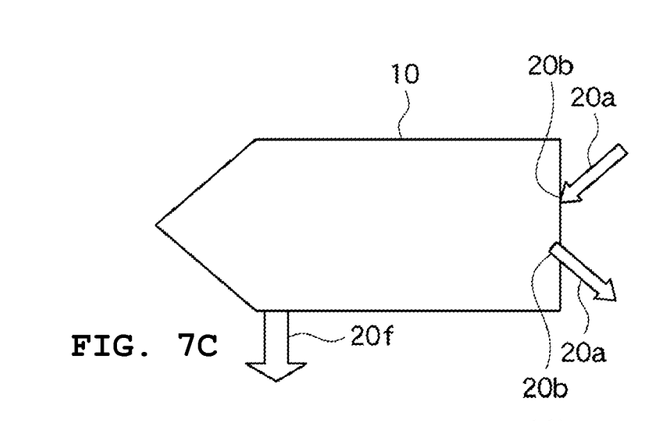
Figure 7D:
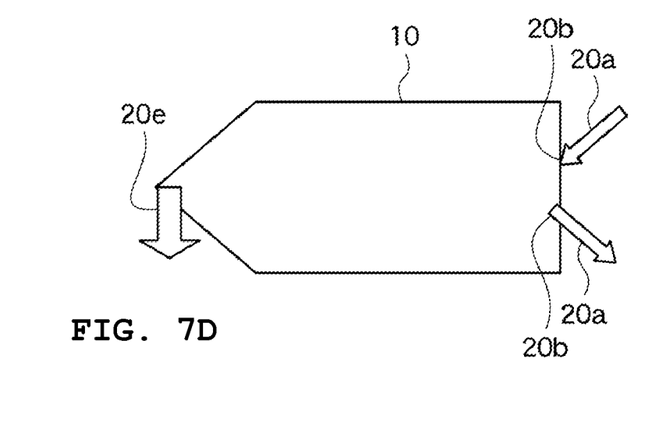

When the traveling state is stop and the traveling plan is in-place turning, as shown in FIG. 7A, the steering systems steer the outboard motors 20a, the engine outputs of the outboard motors 20a are operated to travel forward, and an output of the trawling motor 20e is operated to travel rearward and opposite to the engine outputs. Thereby, the watercraft can perform an in-place turn. As shown in FIG. 7B, the engine outputs of the two outboard motors are made in directions opposite to each other. This also allows the watercraft to make an in-place turn. Furthermore, as shown in FIG. 7C, the steering systems 20b steer the two outboard motors 20a in directions opposite to each other, the engine outputs are made to be opposite to each other, and the bow thruster 20f operates while being directed inward. This allows faster achievement of an in-place turn. As shown in FIG. 7D, the steering systems 20b steer the two outboard motors 20a in directions opposite to each other, and the engine outputs are made in directions opposite to each other, and the trawling motor operates inward. This also allows faster achievement of an in-place turn.

Figures 8A, 8B:
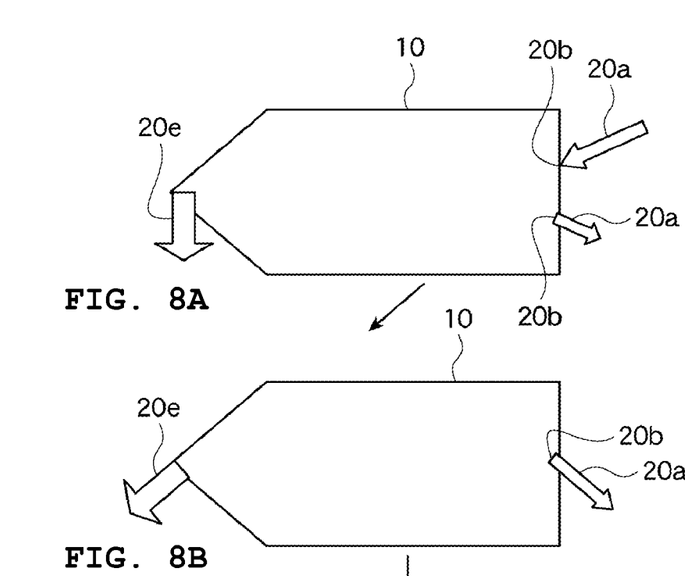
FIGS. 8A through 8F are diagrams for describing specific examples of selections of the watercraft operating devices to be controlled through the control unit in accordance with preferred embodiments of the present invention with a substantially parallel movement traveling plan.

When the traveling state is stop and the traveling plan is a substantially parallel movement in an obliquely forward direction, as shown in FIG. 8A, the steering systems 20b steer the two outboard motors 20a in directions opposite to each other, one of the engines performs an output for forward traveling, and the other of the engines performs an output for rearward traveling, the engine output for forward traveling is made larger than the engine output for rearward traveling, and further the trawling motor 20e operates in a lateral direction. Thereby, the watercraft achieves the substantially parallel movement in the obliquely forward direction.

Figure 8C:
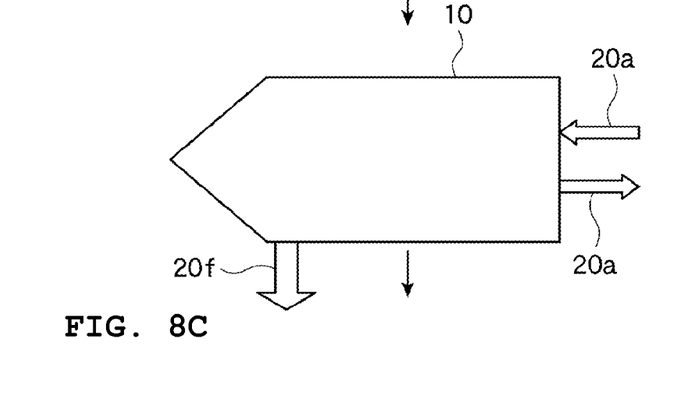
Figure 8D:
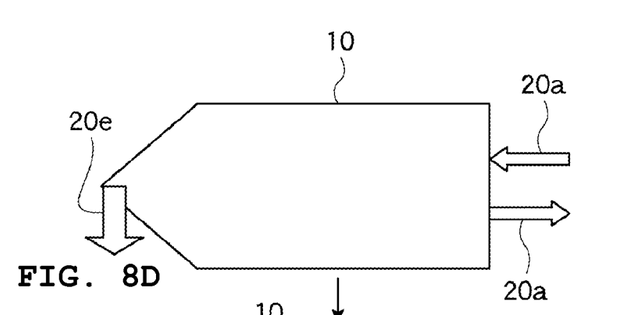

When the traveling state is stop and the traveling plan is substantially parallel movement in a lateral direction, as shown in FIG. 8B, the steering device 20b steers the outboard motor 20a, and the engine performs an output for rearward traveling, and the trawling motor 20e operates while being directed in an obliquely forward direction. This allows the watercraft to make a substantially parallel movement in the lateral direction. As shown in FIG. 8C, one of the two outboard motors 20a performs an output for forward traveling, and the other performs an output for rearward traveling, the bow thruster 20f operates in a lateral direction. Thereby, the watercraft can make a substantially parallel movement in the lateral direction. Furthermore, as shown in FIG. 8D, one of the two outboard motors 20a performs an engine output for forward traveling, the other performs an engine output for rearward traveling, and the trawling motor 20e operates in a lateral direction, and thereby a substantially parallel movement in the lateral direction is also achieved.

Figure 8E:
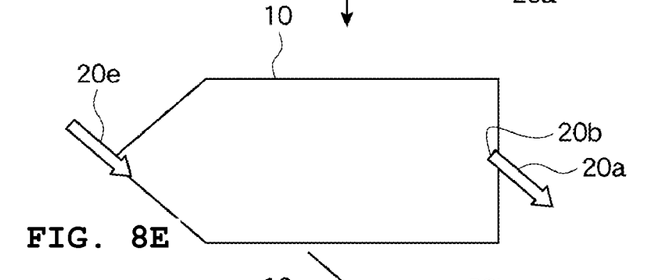

When the traveling state is stop and the traveling plan is substantially parallel movement in an obliquely rearward direction, as shown in FIG. 8E, the steering system 20b steers the outboard motor 20a, and the engine output performs rearward traveling, and the trawling motor 20e operates while being directed in an obliquely rearward direction. This allows the watercraft to make a substantially parallel movement in the obliquely rearward direction.

Figure 8F:
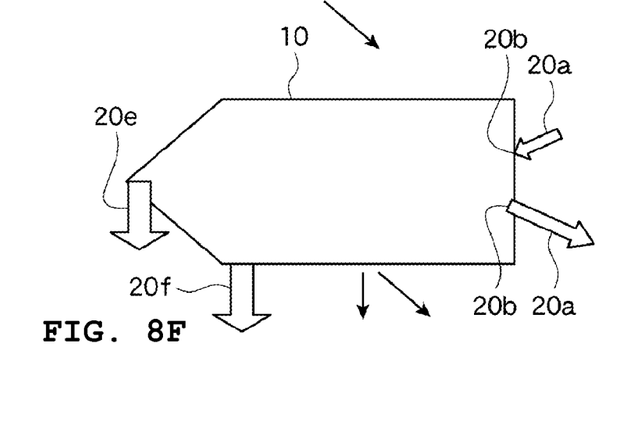

When the traveling state is stop and the traveling plan is substantially parallel movement in a lateral direction or substantially parallel movement in an obliquely rearward direction, as shown in FIG. 8F, the steering systems steer the two outboard motors 20a in directions opposite to each other, one of the outboard motors performs an engine output for forward traveling, the other performs an engine output for rearward traveling, the engine output for rearward traveling is made larger than the engine output for forward traveling, and further the trawling motor 20e and the bow thruster 20f operate in a lateral direction. Thereby, the watercraft can make a substantially parallel movement in the lateral direction or the obliquely rearward direction.

Figure 9A:
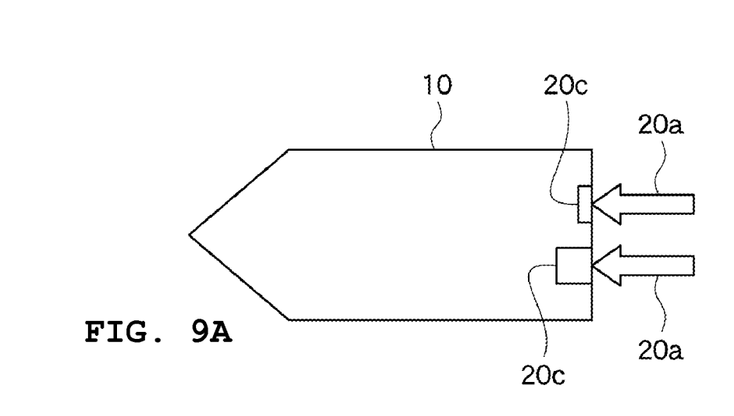
FIGS. 9A through 9D are diagrams for describing specific examples of selections of the watercraft operating devices to be controlled through the control unit in accordance with preferred embodiments of the present invention with an attitude retaining traveling plan.

When the traveling state is high speed forward traveling and the traveling plan is an attitude to retain against rolling or pitching, as shown in FIG. 9A, the trims 20c of the two outboard motors 20a are adjusted to move differently from each other, and thereby the attitude of the watercraft can be retained.

Figure 9B:
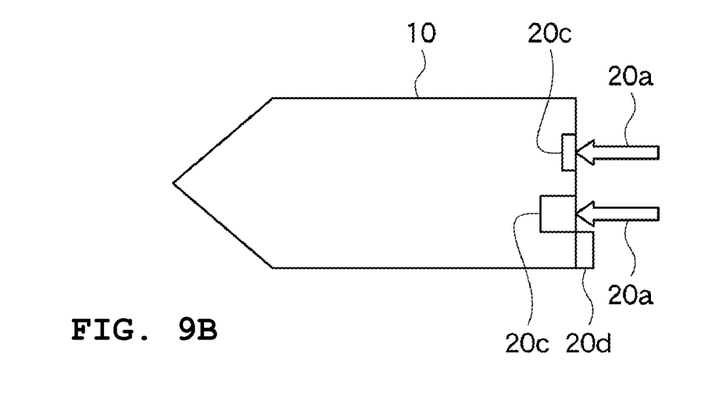

When the traveling state is medium speed forward traveling and the traveling plan is an attitude to retain against rolling or pitching, as shown in FIG. 9B, the trims 20c of the two outboard motors 20a are adjusted to move differently from each other, and the flap 20d is adjusted. This allows the watercraft to retain the attitude.

Figure 9C:
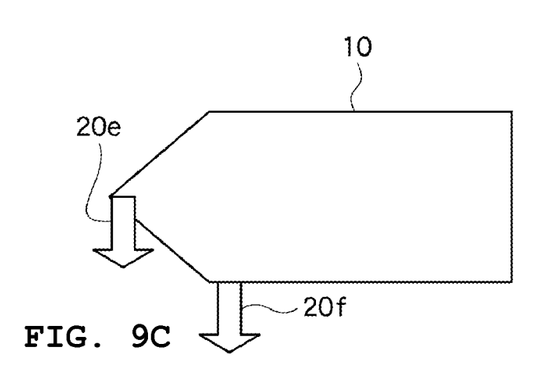

When the traveling state is low speed or trawling and the traveling plan is an attitude to retain against rolling, as shown in FIG. 9C, the trawling motor 20e and the bow thruster 20f are adjusted, and thereby the attitude is retained.

Figure 9D:
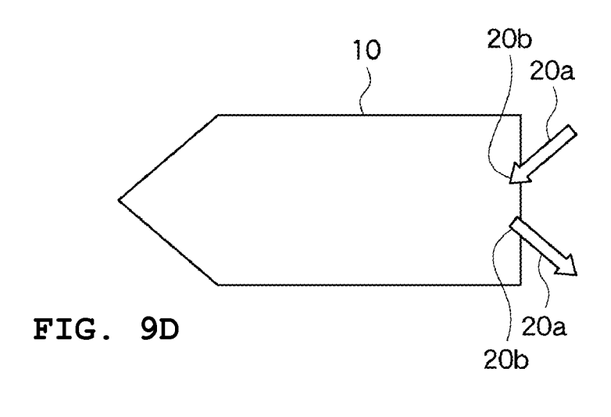

When the traveling state is low speed or trawling and the traveling plan is an attitude to retain against rolling or pitching, as shown in FIG. 9D, there are cases that the watercraft can retain the attitude by steering the outboard motors 20a through the steering systems 20b.

In the present preferred embodiment, in executing the control based on the traveling plan in step S160 through step S180 as described above, a determination is made whether or not the target output is obtained in each watercraft operating device 20a-20f in step S190, and thereby a determination is made whether there is any failure in each of the watercraft operating devices 20a-20f. In this step, if the target output cannot be obtained, the process returns to step S160. Then, another watercraft operating device 20a-20f is selected to be controlled. The target output of the selected watercraft operating device 20a-20f is calculated, and the device 20a-20f is operated.

When the target output is obtained from the watercraft operating device 20a-20f as a target of control, the process further goes to step S200 after a prescribed period passes in the present preferred embodiment. In step S200, a determination is made whether the target movement change set in step S140 is achieved.

When the target movement change is not achieved, a new target movement change is set corresponding to a deviation between the traveling state before the control started and a present traveling state (which is the traveling state after the control), and a deviation amount between the above deviation and the target movement change set in step S140, and the control of the watercraft operating device is again executed.

The control for an operating plan estimated in step S120 is finished when the target movement change is achieved.

In accordance with the watercraft 10 described previously, the traveling plan estimating device 70 of the control unit 13 estimates a traveling plan of an operator of the watercraft based on the traveling state and the operational states of the operation devices. The watercraft operating device controlling device 80 selects the watercraft operating device 20a-20f to be controlled based on the traveling plan, and controls an operation amount of the actuator operating the watercraft operating device 20a-20f. Therefore, this facilitates automatic optimization of the watercraft operating device 20a-20f for achieving the traveling plan and a watercraft operating state of the watercraft operating device 20a-20f.

Accordingly, this simplifies the work that an operator of the watercraft must perform in order to select the watercraft operating device 20a-20f and adjust the operation amount of the actuator of each of the watercraft operating devices 20a-20f. A desired traveling state can be achieved independently of knowledge, experience, etc. of an operator of the watercraft, and a comfortable operation can be achieved.

Further, the selection of the watercraft operating device 20a-20f and the operation amount thereof are optimized. Accordingly, the watercraft can be effectively operated. This reduces the number of the watercraft operating devices 20a-20f used during watercraft operation and their operation amounts. This facilitates durability of the watercraft operating devices.

In the watercraft 10, the watercraft operating device controlling device 80 controls a propulsive force or a resistance of the propulsion adjusting systems such as, the outboard motors 20a and the flaps 20d that are disposed in the prescribed positions, by operation of the direction controlling systems, such as, the steering wheel 30a and the joystick 30b.

Furthermore, the watercraft operating device controlling device 80 sets a target movement change of the watercraft 10 required to achieve the traveling plan of an operator of the watercraft, calculates a target controlling force including an amount, a direction, and a point of application of propulsive force or resistance provided to the entire watercraft 10 based on the target movement change, selects the watercraft operating device 20a-20f to be controlled, and determines the operation amount of the actuator. This facilitates a precise achievement of the estimated traveling plan, and an enhancement of the operational comfort.

Moreover, a new target movement change, corresponding to a deviation amount between an actual change in the traveling state and the target movement change, is set after a control is made. Therefore, more precise achievement of the traveling plan of an operator of the watercraft is achieved.

In the watercraft 10, when the watercraft operating device controlling device 80 determines that the selected watercraft operating device 20a-20f that is to be controlled is not working properly, the watercraft operating device controlling device 80 selects another watercraft operating device 20a-20f and determines the operation amount of the actuator. Therefore, the watercraft can be operated in the case one of the watercraft operating devices 20a-20f fails.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A watercraft comprising:
a plurality of watercraft operating devices arranged to adjust an amount and/or a direction of a propulsive force or a resistance to the watercraft, the plurality of watercraft operating devices including a steerable outboard motor, a trawling motor, and a bow thruster;
an operation device arranged to operate the plurality of watercraft operating devices; and
a control unit arranged to select a watercraft operating device from among the trawling motor and the bow thruster that provides a propulsion force and a moment that is closest to a target controlling force that achieves a target movement change of the watercraft, and the control unit controls the steerable outboard motor and the selected watercraft operating device such that each of the steerable outboard motor and the selected watercraft operating device generates a propulsion force and a moment based on an operational state of the operation device; wherein
when the control unit judges that either the steerable outboard motor or the selected watercraft operating device is not working properly, the control unit selects another watercraft operating device other than the steerable outboard motor and the selected watercraft operating device to be controlled, and determines an operation amount of the another watercraft operating device other than the steerable outboard motor and the selected watercraft operating device.

2. The watercraft according to claim 1, wherein the operation device includes:
a speed controlling system arranged to adjust a traveling speed of the watercraft; and
a direction controlling system arranged to adjust a traveling direction of the watercraft; and
the control unit includes a watercraft operating device controlling device configured to control the steerable outboard motor and the selected watercraft operating device by operation of the direction controlling system.

3. The watercraft according to claim 1, wherein the control unit includes a watercraft operating device controlling device arranged to:
determine the target movement change of the watercraft based on operation of the operation device;
calculate the target controlling force provided to the watercraft based on the target movement change; and
determine an operation amount of the steerable outboard motor and the selected watercraft operating device based on the target controlling force.

4. The watercraft according to claim 1, wherein the operation device includes an operating element that is manually operated by the operator of the watercraft.

* * * * *